(No Model.)
H. W. SPANG.
ELECTRIC MOTOR.
No. 279,036. Patented June 5, 1883.
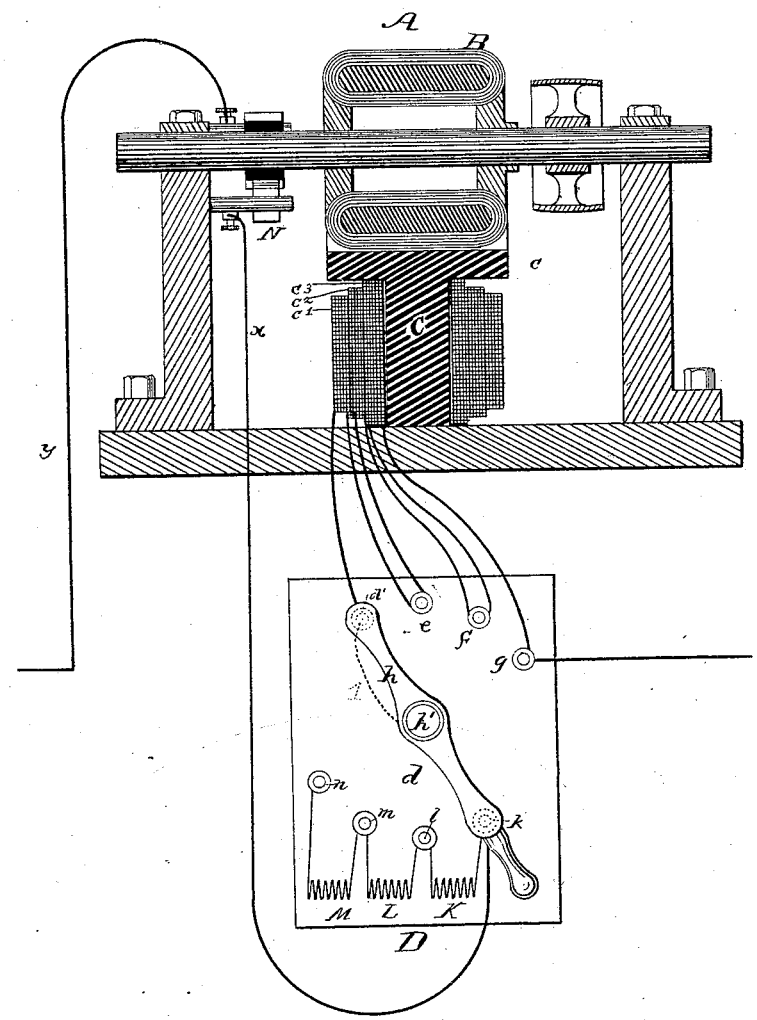
Witnesses
Geo. N. Twiss.
A. A. Connolly.
Inventor
Henry W. Spang
by Connolly Bros.
Attorneys

UNITED STATES PATENT OFFICE.

HENRY W. SPANG, OF READING, PENNSYLVANIA.

ELECTRIC MOTOR.

SPECIFICATION forming part of Letters Patent No. 279,036, dated June 5, 1883.

Application filed March 12, 1883. (No model.)

*To all whom it may concern:*

Be it known that I, HENRY W. SPANG, a citizen of the United States, residing at Reading, in the county of Berks and State of Pennsylvania, have invented certain new and useful Improvements in Electric Motors; and I do hereby declare the following to be a full, clear, and exact description of the invention, reference being had to the accompanying drawings, which form part of this specification, in which the figure is a view illustrating an electro-motor with my improvements applied thereto.

My invention has relation to electric motors, and has reference to means for regulating, controlling, and varying the speed of the same by cutting out or shunting portions of the coils of the field magnet or magnets, such means also comprising resistances introduced into the external circuit and equivalent to that cut out of the field, so as to maintain a constant and unvarying resistance in the entire circuit, thereby preventing reaction upon the generator and on the motor-armature and on other motors where a number of the latter are employed in series.

In an application for patent heretofore filed by me for improvements in electromotors are shown and described means whereby portions of the coils of the field-magnets may be cut out of circuit, thereby reducing the energy of the magnet and diminishing the speed of the armature. I have discovered that it is desirable when this cutting out or shunting of a portion or portions of the field-magnet is accomplished to introduce into the external circuit resistance equivalent to that of the portion or portions of the field-magnet cut out. By this means the resistance of the entire circuit is kept unvarying, so that uniformity of current may be maintained, and the reaction of an excess of current on the generator and on the motor-armature, as well as upon other motors in the same series where two or more are employed, be prevented.

My invention accordingly consists in the combination, with an electromotor constructed or provided with a device whereby a portion or portions of the coils of its field magnet or magnets may be cut out or shunted, of means whereby external resistance the equivalent of that cut out of the field magnet or magnets may be introduced into the external circuit.

Referring to the accompanying drawing, A indicates an electromotor, which may be of any known or suitable type of machine for the purpose. In practice I prefer to employ a motor constructed with a ring-armature and stationary field-magnets within the inductive influence of a pole or the poles of which said armature is located and rotates.

B represents a ring-armature, and C a field-magnet having a pole-piece, $c$, and helices $c'$ $c^2$ $c^3$ of insulated wire. If desired, there may be two or more field-magnets, and the armature may be located and rotate in the field of only one pole or in the fields of two or more poles.

D represents a switch consisting of a base, $d$, of insulating material provided with metallic contact-pieces $d'$ $e$ $f$ $g$ and a metallic lever, $h$, pivoted at $h'$, so that it can be moved into contact successively with the pieces $d'$ $e$ $f$ $g$. The terminals of the helices $c'$ $c^2$ $c^3$ lead, respectively, to the pieces $d'$ $e$ $f$ $g$, as shown, so that by moving the lever $h$ into contact with one of said pieces a portion of the field-magnet is cut out, substantially as described in my aforesaid application.

K L M indicate resistance-coils, (for which, if desired, any other suitable or equivalent form of resistance may be substituted,) which are, respectively, of the same resistance as the magnet-helices $c'$ $c^2$ $c^3$, or sufficient, when thrown into circuit, to compensate for the resistance of said helices when the latter are cut out. These resistance-coils are connected in series with metallic contact-pieces $k$ $l$ $m$ $n$, with which the lever $h$ may also be brought into contact. The circuits are, as indicated in the drawing, the terminal of the wire $x$ from the lower brush, N, leading to the contact-piece $k$, and the outer end of helix $c'$ being connected with contact-piece $d'$. The normal position of parts is as shown in the drawing, in which case all of the field-magnet coils are in circuit. On moving lever $h$ so that its ends rest, respectively, on pieces $e$ and $l$, the helix $c'$ is cut out and resistance K thrown into circuit. By moving lever to stops $f$ and $m$ the two helices $c'$ and $c^2$ are cut out and resistances K and L thrown in, and movement of said lever to stops $g$ and $n$ cuts out helices $c'$ $c^2$ $c^3$ and throws in resistances K, L, and M.

By connecting metallic contact-piece $d'$ with metallic pivot $h$ by a wire, $l$, or by connecting wire with pivot $h'$, instead of contact-piece $d'$, the helices $c'$ $c^2$ $c^3$ will be shunted instead of cut out of circuit when lever $h$ contacts with metallic pieces $e$ $f$ $g$, respectively.

The metallic contact-pieces $d$ $e$ $f$ $g$ and $k$ $l$ $m$ $n$ can be close to each other or so arranged that while lever $h$ moves between any two of the said contact-pieces it will contact with both of them, thereby preventing the main or exterior circuit being opened while lever $h$ is being moved between any two of said contact-pieces.

Any other suitable switch may be employed, and in many cases it may be preferable to use one having a sliding device, moving like the sliding bolt of a window-shutter, and contacting with conductors or pieces $d$ $e$ $f$ $g$ and $k$ $l$ $m$ $n$, or their equivalent, for the purpose hereinbefore set forth.

My invention embraces any means whereby a diversion of the current from a portion or portions of the magnet is effected, such portion or portions being either cut out or shunted by the provision of a new path through the magnet, such new path containing resistance equivalent to the cut-out or shunted portion or portions of the magnet.

What I claim as my invention is as follows:

1. The combination, with an electromotor constructed and provided with means for cutting or shunting a portion of the coils of the field-magnet out of circuit, of means for introducing into the exterior circuit resistance equivalent to that of the coils cut out or shunted, substantially as shown and described.

2. The combination, with an electromotor, of a switch or shunting device having a movable lever and contact-pieces with which the terminals of the coils of the field-magnet and resistances respectively connect, whereby a movement of said switch will cut out or shunt a portion of the coils of said magnet and simultaneously introduce into the circuit resistances equivalent to that of the portion of the magnet cut out or shunted.

In testimony that I claim the foregoing I have hereunto set my hand this 6th day of March, 1883.

HENRY W. SPANG.

Witnesses:
C. HOLTON,
ISAAC Y. SPANG.